March 27, 1962     A. S. TAKACS ETAL     3,026,574
PROCESS FOR MOLDING A FOAMABLE SHELL ONTO A SPONGE BASE
Filed July 30, 1957     2 Sheets-Sheet 1
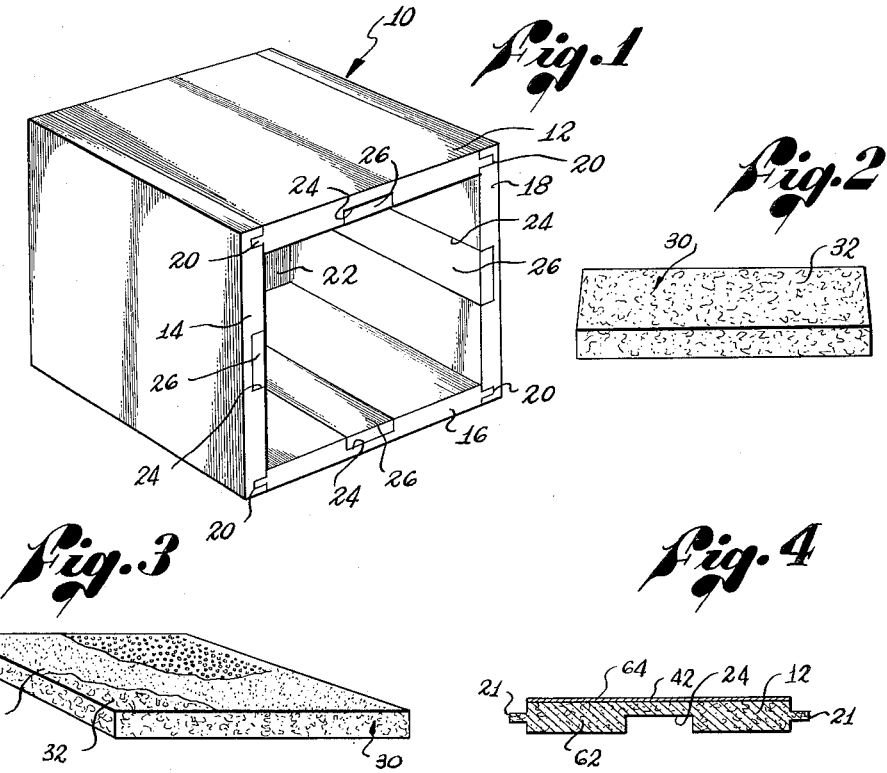
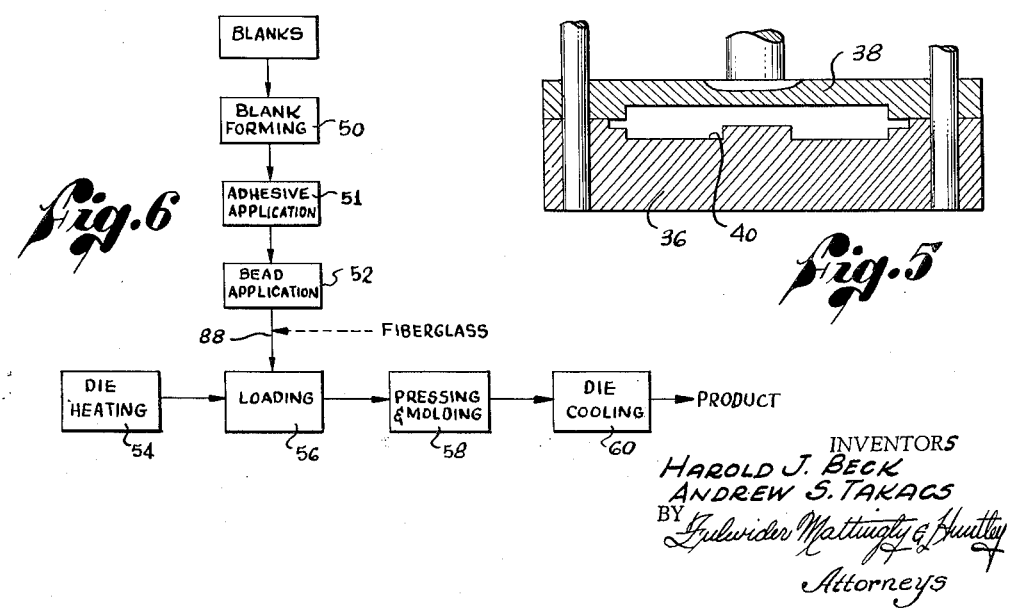
INVENTORS
HAROLD J. BECK
ANDREW S. TAKACS
BY
Attorneys March 27, 1962     A. S. TAKACS ETAL     3,026,574
PROCESS FOR MOLDING A FOAMABLE SHELL ONTO A SPONGE BASE
Filed July 30, 1957     2 Sheets-Sheet 2
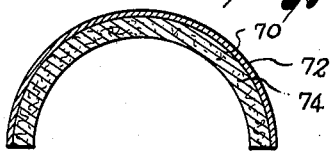
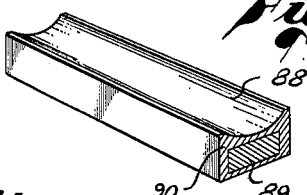
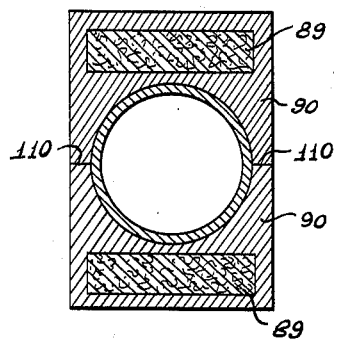
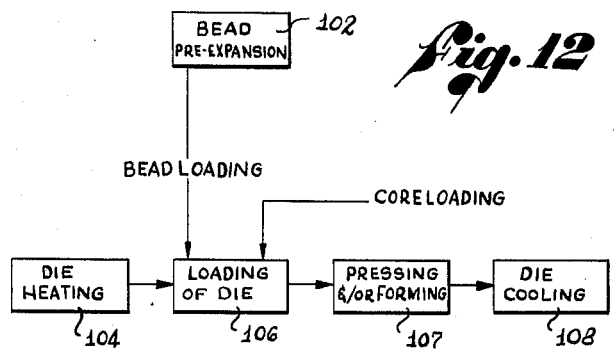
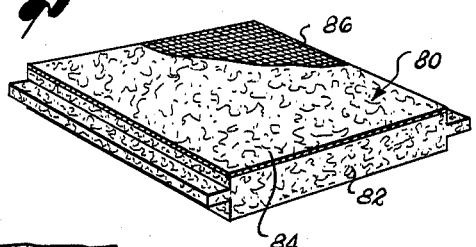
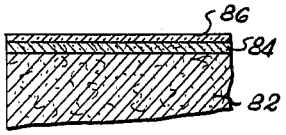
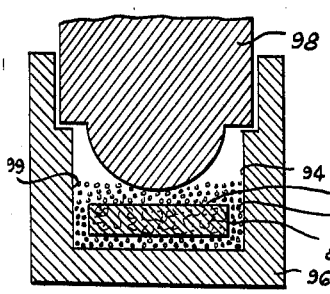
INVENTORS
HAROLD J. BECK
ANDREW S. TAKACS
BY
Attorneys 3,026,574
PROCESS FOR MOLDING A FOAMABLE SHELL ONTO A SPONGE BASE
Andrew S. Takacs, Northridge, and Harold J. Beck, Granada Hills, Calif., assignors to Techniform, Inc., Van Nuys, Calif., a corporation of California
Filed July 30, 1957, Ser. No. 675,179
5 Claims. (Cl. 18—59)

This invention relates to improved thermoplastic articles and to processes of manufacture thereof, and relates more specifically to thermoplastic sponge articles having smooth surfaces and to processes for making such smooth-surfaced thermoplastic articles.

In the past, and for some time now, it has been the practice to make certain types of articles, such as Christmas ornaments, display accessories, packaging matrices for perfume bottles and the like from thermoplastic sponge material such as the foams of polystyrene or cellulose acetate. These foam or sponge materials greatly resemble solidified foam or froth and are characterized by an extremely low density ranging from one to twenty pounds per cubic foot, depending upon the particular material employed.

The surfaces of a body of all such foam materials of the class described are extremely porous and consequently tend to become dirty and discolored very rapidly due to the collection of dust in the surface pores and the impossibility of cleaning, once the dust has collected in such pores. In addition, since the outer surface of the body is extremely porous, it is easily penetrated and deformed, rendering it of little use in any structural application. The material is solid and stable at temperatures below approximately 180° F., and, except for its poor strength characteristics, it would have wide application in the low-temperature insulation field, such as, for example, in pipe coverings, in refrigeration parts for doors, truck bodies, railroad cars and the like, and such other miscellaneous applications as toys, buoyant members and packaging materials.

Many attempts have been made to produce a a thermoplastic foamed sponge article having a smooth, tough, impervious surface for utility in structural applications. The better known products and methods have, however, several major disadvantages. For example, one process compresses to a substantial degree a thermoplastic sponge blank in a mold at a temperature above the softening point of the thermoplastic material, thereby substantially increasing the impact strength, tensile strength, and compressive strength of the surface or skin produced. While such a process has many advantages, a material of high density must initially be used for best results, and the compression ratio must be at least 2:1 in order to get substantial increases in the toughness of the skin. Further, while the surface produced is substantially smooth, it still has some porosity and is not impervious to the entrance of liquid material, water, etc. In addition, the increase in strength brought about by the above-described compression process still necessitates, in most cases, that a hard outer shell of material be employed as the final outer covering in order to render the material useful in structural applications.

Another mode of producing smooth surfaces on thermoplastic sponge materials which is greatly employed at the present time, is the use of fiberglass material bonded to thermoplastic sponge. The fiberglass material is generally first impregnated, for example, with an epoxy or polyester resin. In the specific case of a polystyrene foam bonded with a polyester impregnated fiberglass, an intervening barrier coat must be applied between the sponge and fiberglass layer to prevent any attack upon the polystyrene by means of the polyester resin in the fiberglass layer. Aside from this disadvantage in this particular combination, the cost of fiberglass is extremely high in comparison to the cost of the thermoplastic foam materials, thereby greatly increasing the cost of the finished article. The labor requirements for producing an impregnated fiberglass layer bonded to the foam are substantial. Other laminating materials, such as plywood, are sometimes employed to obtain smooth hard surfaces but with great increase in the over-all density of the article.

According to our invention, we have made novel thermoplastic articles of manufacture having basically a thermoplastic sponge composition. The novel articles made by our new process retain the advantageous characteristics of the sponge material, that is, extremely low density, distinctive appearance, water absorption resistance, and excellent heat and cold insulating qualities, but embody new and advantageous features of greatly increased tensile and compressive strength characteristics, high impact resistance, and imperviousness. The articles made according to our new process also have the advantage of being readily and inexpensively produced in a great variety of shapes.

Bearing in mind the foregoing facts, it is a major object of our invention to provide a method for forming articles from a thermoplastic sponge material, which articles are characterized in having approximately the same density as the original material, and a smooth surface of substantially higher strength than the original sponge material.

It is another object of our invention to produce an article of manufacture comprising a body of thermoplastic sponge material of a given composition enclosed by a surface layer of solid thermoplastic material of the same composition and integral with said body, said surface layer having substantially greater strength than said body and presenting a smooth, impervious, exterior surface on the sponge material.

Still another object of the present invention is to provide a process for forming a smooth light-weight surface on thermoplastic sponge articles in a relatively inexpensive manner, and which produces an extremely light-weight sponge having a desired surface hardness, impact resistance, and surface tensile and compressive strength characteristics controllable within large values.

It is another major object of the present invention to provide a process for making an article comprised substantially entirely of a thermoplastic material, the article produced having an extremely tough, light-weight skin which is substantially non-porous and highly impact resistant, which has high tensile and compressive strength, which is of substantially greater toughness and imperviousness than that formed by compression process of the above-described prior art, and which is substantially less expensive to produce than the fiberglass reinforced foams of the above-described prior art process.

Another object of the present invention is to provide a process for making sponge articles for low-temperature insulation, comprising thermoplastic materials having smooth, impact-resistant surfaces suitable for structural applications, said smooth surfaces being capable of being dyed to any desired color.

A further object of the present invention is to provide a process for making a sponge article wherein a multiplicity of thermoplastic particles of specific size, having a volatile solvent liquid absorbed therein, is expanded, and simultaneously compressed and fused in place on the surface of a thermoplastic sponge material to form thereon a skin of any desired thickness and density, the skin having predeterminable impact, tensile and compressive strength characteristics.

It is still another object of the present invention to provide a process for the making of a hard-shelled thermoplastic cellular article from a cellular blank wherein thermoplastic granule-like materials, having an expanding agent therein, are expanded in place on the surface of the thermoplastic cellular blank between certain limits of temperature and pressure whereby the blank is compressed and molded to a desired shape while the hard shell of thermoplastic material is simultaneously formed, the shell having extremely high impact resistance and tensile and compressive strength characteristics.

Yet another object of the present invention is to provide a thermoplastic sponge article having a smooth, hard, impervious integral thermoplastic skin which is further strengthened by the addition of a molded fiberglass layer intimately bonded to the thermoplastic skin of said thermoplastic sponge material.

It is a further object of the present invention to provide a thermoplastic sponge article having an extremely tough shell integrally fused to a body of thermoplastic sponge material, the shell being composed of a plurality of thermoplastic beads expanded to a predetermined size under proper conditions of temperature and pressure so as to be fused together to form the shell of said article.

Still another object of the present invention is to provide a molded article comprising a light-weight thermoplastic shell intimately bonded to similar or dissimilar thermoplastic sponge materials to be used wherein insulation and low weight are prime factors of design.

As mentioned, thermoplastic sponge materials are highly useful for low-temperature insulation purposes, such as, for example in pipe covering, and while generally the skin of the pipe covering need not have a hard shell thereon, a smooth cover which is stronger than the sponge material itself is desirable. Hitherto, one preferred mode of forming such insulative materials has been to expand a plurality of thermoplastic beads (containing an expanding or foaming agent therein) to the desired shape in a properly heated and designed mold. The mold must then be cooled below a certain critical temperature in order that bead expansion cease. The die-cooling and heating steps are the most time-consuming and a substantial increase in rate of cooling of the dies would thus enable substantial decreases in the production time of sponge articles to be made.

It is therefore another major object of the present invention to provide a process for making a thermoplastic sponge material having high insulative properties wherein the article made is rapidly cooled in an improved manner immediately after the molding thereof.

It is a further object of the present invention to provide a process for making an insulative smooth-surfaced thermoplastic sponge article from a thermoplastic sponge core and a plurality of thermoplastic beads which have been fused onto the core, the rate of cooling of the article being more rapid than has hitherto been attainable.

Yet another object of the present invention is to provide an improved process for making thermoplastic insulative articles rapidly which comprises the step of enveloping a multiplicity of expandable thermoplastic granules about an expanded thermoplastic sponge core and subjecting said core to a temperature above the softening and expansion point of the granules whereby to shape said granules and mold an article to a desired shape, the core being maintained at a temperature below its softening point during the molding step.

These and other objects of the invention will become clearly understood by referring to the following description, and to the accompanying drawings, in which:

FIGURE 1 is a perspective view of a refrigerator box constructed of thermoplastic parts formed according to our invention;

FIGURE 2 is a perspective view of a blank of raw sponge material from which one of the parts of the refrigerator box is made;

FIGURE 3 is a perspective view of the blank in FIGURE 2 shown in a partially processed state;

FIGURE 4 is a cross-sectional view of a completed part of one of the walls of the refrigerator box shown in FIGURE 1;

FIGURE 5 is a cross-section of the die parts employed in forming the article of FIGURE 4;

FIGURE 6 is a diagrammatic representation of one preferred form of the process of our invention;

FIGURE 7 is a cross-sectional view of another article of manufacture constructed according to the preferred process of our invention;

FIGURES 8 and 9 are perspective and cross-sectional views, respectively, of a modified article of manufacture formed according to a modified form of the process of our invention;

FIGURE 10 is a perspective view of a section of a pipe cover formed according to a modified process of our invention;

FIGURE 11 is a cross-sectional view of a completed pipe cover formed according to the modified process of our invention;

FIGURE 12 is a diagrammatic representation of the modified process for making the pipe cover of FIGURES 10 and 11; and FIGURE 13 is a cross-sectional view of a mold for making the pipe cover of FIGURE 10.

We have discovered that novel thermoplastic sponge materials may, by the method of our invention, be readily formed in a desired shape and, at the same time, be given new and superior strength characteristics which greatly increase the utility of the articles so formed, the processes being relatively simple and inexpensive in operation. As an example of the utility of our process, a refrigerator box composed of a novel thermoplastic material of our invention will be specifically described.

The refrigerator boxes here under discussion are intended primarily for display purposes for frozen foods and the like in grocery stores, supermarkets, etc. Normally, the cost of advertising a particular food product in the freezer of a supermarket is prohibitive because of the high cost of the freezer space, and, therefore, while it is frequently desirable to call attention to frozen goods and other foods which must be maintained at low temperatures, such is usually not done.

In order to advertise and call specific attention to certain refrigerated foods, one economical way is to place them in inexpensive refrigerated containers bearing advertising set apart from the normal freezer sections. To this end, the refrigerator box composed of parts of our invention is ideally suited because of its extremely low density, ease of formability, and, above all, its substantially improved strength characteristics allowing the refrigerator box to withstand severe handling, shock and loads.

The references in the specification and claims to thermoplastic sponge materials include solidified foams or froths of the thermoplastic, plastic or resinous type. Specific examples of such materials included in the generic term "thermoplastic sponge material" are polystyrene foam manufactured and sold by the Dow Chemical Company under the trademark "Styrofoam," and cellulose acetate foam (sometimes referred to as an expanded cellulose acetate), manufactured and sold by the Strux Corporation under the trademark "Strux." Although not so readily available as the foamed polystyrene and cellulose acetate, the thermoplastic sponge materials referred to herein comprise also foams or froth of any of the thermoplastic synthetic resins, e.g., the cellulose derivative plastics, such as cellulose nitrate, cellulose acetate butyrate, and ethyl cellulose, or methyl methacrylate plastics, or nylon resins, or vinyl resins, such as polyvinyl chloride, polyvinyl acetate, co-polymers of vinyl chloride and vinyl acetate, polyvinyl butyral, polyethylene, and polyvinylidene chloride. While thermoplastic sponge materials are usually generally used, it is possible to use certain thermosetting foam materials also, such as the phenolic resins.

In addition, references made herein to thermoplastic granular or bead materials are intended to include all thermoplastic materials of the type described above, but in a granular form, each granule of which contains expanding agents, said expanding agents being generally volatile organic liquids, such as chlorinated low molecular weight hydrocarbons or other low molecular weight hydrocarbon materials.

Referring now to the drawings, and especially to FIGURE 1 thereof, a refrigerator box embodying the principles of our invention is therein illustrated and designated generally by the numeral 10. The refrigerator box 10 has four side walls, 12, 14, 16 and 18 affixed to each other as by a tongue and groove construction 20, and cemented or glued in any suitable manner. The box also has a bottom member 22 affixed to the side walls 12, 14, 16 and 18. The walls 12, 14, 16 and 18 and the bottom 22 of the refrigerator box 10 are all composed of highly insulative novel thermoplastic sponge materials having extremely low density, high skin strength, high impact resistance, and high tensile compressive strength, and are made in accordance with the process of our invention to be described.

Each wall 12, 14, 16 and 18 has provided therein an elongated cavity 24 of rectangular cross-section for the reception of elongated packages 26 of frozen "plastic ice" or ordinary ice. Plastic ice is preferable inasmuch as it remains frozen for a substantially longer period of time than ordinary ice, an example of one such plastic ice being "Permatite" manufactured by Permatite Products Co. of Riverside, California. In this manner, the interior of the refrigerator box 10 is maintained at low temperatures for a period of time of twenty-four hours or longer.

For purposes of illustration of the process of our invention, the making of wall 12 will be described in detail. The wall is made from a blank 30 of thermoplastic sponge material, shown in FIGURE 2, having a density of between one and six pounds per cubic foot. The blank 30 is cut from a larger plank or sheet of foam material (not shown) to the approximate final dimensions of the wall 12 by any suitable method, for example, by employing ordinary woodworking tools or by means of a hot wire which acts as a cutting member.

Referring now especially to FIGURE 3, the next step in forming the wall 12 is to apply a solvent adhesive to a portion of one face 32 of the blank 30 in such a manner as to impart a very slightly tacky surface to the face. To this end, a thermoplastic solvent adhesive such as a chlorinated hydrocarbon (preferably perchloroethylene), a ketone, or an ester is very lightly sprayed onto one face 32 of the blank 30, the adhesive layer being designated generally by the numeral 33 in FIGURE 3. It is to be emphasized that use of a solvent adhesive is for the purpose of positioning the granules 34 on the blank 30 prior to the fusion and compression step.

Other types of adhesives, or other different modes of positioning the granules 34 on the blank 30 not involving adhesives can be employed. For example, the granules 34 may be sprayed under pressure onto the porous surface of the blank 30 so as to lodge in the pores thereof.

If it is desired to color the surface, a standard dye may be sprayed onto the blank 30 prior to the bead application, either along with the adhesive or separately, if no adhesive is employed.

Expandable thermoplastic granules 34 are then positioned, on the portion of the face 32 previously sprayed, in an extremely closely-packed manner and adhere to the adhesive layer 33. The solvent is then rapidly evaporated upon standing in air or evaporated in any other suitable manner.

The expandable thermoplastic granules, as mentioned, have heat-expandable agents homogeneously dispersed within each granule. Examples of such granules are "dylite" expandable polystyrene manufactured by Koppers Company, Inc., and experimental plastic Q-865 polystyrenes, as well as other expandable thermoplastic granules, range in size from 0.1 mm. to 8 mm., and contain a volatile organic liquid hydrocarbon, such as petroleum ether or hexane having a boiling point of between 85 and 160° F., as the expanding agent.

The sponge blank 30, one surface of which is coated with the granules 34, is formed according to the method of our invention in the following steps and operations: Referring to FIGURE 5 especially, the die members 36 and 38 for forming the wall 12 are first heated, as for example, by steam, and then the blank 30 is placed within the cavity or recess 40 in the female die member 36. The die member 38 is placed on top of the blank 30 and a predetermined compressive force is applied between the two die parts. After the compressive force has been exerted for a predetermined period of time sufficient to form the hard smooth surface, the die 13 cooled, opened, and the finished wall part 12, shown in FIGURE 4, is removed. The hard surface or shell is designated by the numeral 42. The die parts are then reheated preparatory to receiving a second blank 30 for forming a second wall 18.

The temperatures and pressures to which the blank 30 are subjected and the temperatures at which it is cooled following the forming operation vary, depending upon the shape and surface desired in the finished part. It may be stated generally that prior to receiving the blank 30, the die parts 36, 38 are heated to a temperature in excess of the softening temperature of both the thermoplastic sponge and granule material 30, 34, which is also in excess of that required to expand the thermoplastic granules 34. In this connection, it is to be noted that the expansion temperature of the granules 34 is below the softening temperature of the thermoplastic sponge 30. If this were not so, the thermoplastic sponge 30 would be melted prior to the expansion of the granules 34. Application of the heat to the dies expands the thermoplastic beads 34 so that they fuse with one another during the expansion under pressure, and also fuse with the outer surface of the thermoplastic sponge blank 30.

As the expandable thermoplastic granules are expanded under heat, a sufficient pressure is exerted to compress the granules and crush them together so as to form a fused, extremely hard and impact-resistant mass on the surface of the sponge, having great tensile and compressive strength. It is to be noted that the compressive force required must be great enough to overcome the expanding force of the granules 34, i.e., to overcome the pressure exerted by the volatile organic liquid contained within the granule 34 as it is gasified by the heat. In general, where no actual molding of the sponge part is required, but only the formation of a hard surface, the surface of the sponge blank 30 need be compressed only very slightly, approximately of the order of $\frac{1}{16}$ to $\frac{1}{4}$ inch, regardless of the thickness of the blank, while the remainder of the blank remains uncompressed. The pressure employed lies generally between one and twenty-five pounds per square inch where no compression of the sponge itself is required.

It will be understood that by regulating the pressure during the heating of the part, and by choosing granules of appropriate size, the granules 34 can be expanded in a controlled manner to a desired size. The resulting surface can have a hardness and thickness varying from an extremely thin, hard-shelled surface of $\frac{1}{32}$ inch to a smooth, slightly softer and substantially thicker surface of $\frac{1}{2}$ inch. At both extremes of surface hardness it should be pointed out that where no molding is desired, but only a hard surfacing required, the bulk of the wall 12 remains substantially undeformed and is of substantially the same density as the original blank 30. The resulting article thus is formed with two distinct zones, the shell or skin zone 42, and the sponge zone 62, as best seen in FIGURE 4.

Where molding or shaping is desired, the upper limit of molding pressure is dictated by the compressive strength of the sponge blank 30, which, for example, is, at a density of ten pounds per cubic foot, approximately 125 p.s.i. The forming pressure, of course, must be sufficiently high to displace the thermoplastic sponge blank 30 which is rendered fluid or plastic by the heating thereof, to the appropriate new locations during the molding of the article.

Following the forming operation, the die is immediately cooled to a temperature below the softening point of the material and below the expansion temperature of the expanding agent.

Referring especially to FIGURE 6, a process for making the wall 12 of a specific material will now be described. A polystyrene blank 30, as shown in FIGURE 2, is cut from a plank in the blank forming zone, designated generally by the numeral 50, as described previously. One surface of the polystyrene blank 30 is then lightly sprayed with polychloroethylene having a dye dissolved therein, to form a fine film of colored adhesive on the blank at zone 51. A multiplicity of expandable polystyrene beads or granules 34, 2 mm. in size, are then applied onto the sprayed surface in closely-packed fashion at zone 52. The softening point of polystyrene is approximately 180° F., and the boiling point of petroleum ether, employed as the expansion agent for the beads 34, is approximately 120° F.

The dies 36, 38 are heated to a temperature of between 180° and 250° F., as designated at the process stage 54, and after the adhesive on the blank has evaporated, the beaded sponge blank is loaded in the dies. The temperature of the dies 36, 38 is preferably maintained at 250° F., so that the thermoplastic material may be softened very rapidly. Above 250° F., substantial melting of the polystyrene materials takes place rather than a plastic deformation or molding thereof. The molding pressures or forming pressures are extremely low and generally lie between one and twenty-five pounds per square inch, the forming pressure being understood to be the total die-closing force divided by the area of the blank normal to the direction of the die-closing movement. In the molding of the wall 12 at zone 58, it is found that forming pressures of approximately five pounds per square inch are sufficient to deform the polystyrene sponge blank 30 to the required shape and also to overcome the expansion of the expandable beads 34. The beads 34, rather than projecting from the surface of the article or blank, are thus crushed and fused together to form an impervious and tough colored skin 42 on the surface of the wall 12.

It will be noted that the tongues 21 of the tongue and groove joint 20 are not formed with a hard shell, but are compressed to a much greater degree than the wall 12 itself. As the density of the tongue 21 is substantially increased, its strength is substantially increased.

As soon as the hardened surface or shell 42 of the wall port 12 is formed, the dies 36, 38 must be cooled as indicated by process stage 60, in order to prevent further foaming or expansion of the expandable polystyrene beads 34. The dies 36, 38 are cooled rapidly by the use of cold water at a temperature of 70 or 80° F., or by any other suitable means. The article to be molded or formed is thus reduced in temperature at which the expansion agent volatilizes, the expansion of the polystyrene thereupon ceasing. The product is then removed from the die and the die is reheated to the proper temperature and loaded, as described previously.

As a second example of the process, cellulose acetate sponge is employed as the blank 30 with the expandable polystyrene granules 34 under conditions substantially identical with those described in the first example.

Because of the low forming pressures employed and the relatively low temperatures at which the dies are operated, it is possible to use dies of relatively inexpensive construction. In this connection, it is pointed out that the accompanying drawings are not necessarily to scale, nor are they intended to represent by their proportions the thicknesses of the various die parts. In most cases, the thicknesses have been exaggerated in the drawings for the purpose of clarifying the details of construction.

The process of our invention provides an entirely new and different material from any heretofore produced. The finished product (FIGURE 4) comprises a body portion 62, the bulk of which has the physical and chemical structure of the original thermoplastic foam blank 30. The body 62 is integrally joined to the outer thermoplastic skin 42 which comprises a plurality of fused granules of thermoplastic material expanded under pressure, the resulting skin having a smooth, impervious, highly impact-resistant and strong surface. The actual thickness of the skin is dependent upon the size of the granules originally used, as well as the forming temperature and pressures employed. As mentioned hitherto, the skin 42 is substantially stronger than the original thermoplastic foam blank 30 and it will, of course, be realized that the skin 42 could readily be made to completely envelop the body 62, if desired.

At a point just below the skin, designated by the numeral 64 in FIGURE 4, the thermoplastic foam is slightly compressed, on the order of $\frac{1}{16}$ inch, but this cannot be distinguished visually from the main body 62 of the undeformed thermoplastic foam.

Referring now especially to FIGURE 7, a molded, hard-shelled thermoplastic sponge article 70 is there illustrated made according to the above-described process of our invention, as represented in full line in FIGURE 6. The article 70 is curved and the skin 72 thereon is formed at the same time that the article is bent and molded. The temperature employed during forming is above the softening point of the thermoplastic material utilized, and is above the boiling point of the volatile liquid within the thermoplastic granules 34.

The forming pressure is somewhat greater than that required to produce the wall section blank 30, and the thickness of the original sponge is substantially reduced during the molding process during the forming of the skin 72 thereon. While the skin 72 so formed has approximately the same strength characteristics as described with reference to the skin 42 formed on the wall section 12, the thermoplastic foam body 74, being substantially compressed during the molding process, has much greater strength than the original thermoplastic sponge from which the blank is cut.

While the compression of thermoplastic sponge blanks, under heat and pressure to thereby produce molded blanks of high strengths in comparison to the original foam, is old in the art, the combination of compressed high-strength foam with an extremely hard surface shell of the type described provides a new and useful product which has numerous new uses. As a specific example of materials that may be employed, polystyrene foam material may be used for the body portion 74 and expandable polystyrene granules can be employed to form the skin 72. The process conditions above described with reference to the making of the wall section 12 are followed, with the exception that the molding pressure in the conforming mold is increased to between approximately twenty-five to fifty pounds per square inch to compress and form the article.

A modified wall section 80 for the refrigerator box 12 that is produced according to the principles of our invention is shown in FIGURES 8 and 9. The wall 80 is composed of a thermoplastic sponge body 82 of the type described previously, and a thermoplastic skin 84 integrally fused to the surface of the body 82, the skin being composed of expanded thermoplastic granules 34 which have been crushed and fused together to form a hard, impervious and strong outer layer, the process of formation being described previously with reference to FIGURE 6. The skin 84 has bonded thereto a fiberglass sheet or layer 86 which may or may not be impregnated with a reinforcing resin, for example, of the epoxy group. The fiberglass layer 86 serves to further reinforce and strengthen the skin 84 of the wall section 80, and such an article is therefore employed where exceptional strength characteristics are required.

If a fiberglass layer is resin impregnated, the resin employed should be unreactive towards the particular thermoplastic skin 84 formed. However, if, for some reason, the resin required is reactive to the skin 84, a barrier layer can be interposed between the skin and fiberglass to prevent interaction.

The process for making a fiberglass reinforced wall 80 is similar to that described with reference to FIGURE 6, but is modified in that the fiberglass sheet 86 is positioned on the granules 34 (by means of any suitable adhesive, such as an epoxy base adhesive) prior to the loading of the sponge blank 30 into the dies 36, 38, as indicated by the dotted line at 88 in FIGURE 6. The blank 30 is then pressed and/or molded under conditions of temperature and pressure comparable to those previously described, to form the fiberglass-thermoplastic wall section 80. It should be understood that other strengthening materials, as well as fiberglass, may also be molded at the same time that the piece is being molded and the skin is formed, and it should also be understood that a plurality of alternating fiberglass-bead layers may be applied to the blank 30 for even greater strength.

Referring now to FIGURES 10-13, a novel insulative article and modified process for producing it will be described. As an example of the process, the production of a novel pipe cover 88 is set forth. The pipe cover 88 comprises a thermoplastic non-deformed sponge core 89 and an enveloping outer skin 90 comprising a plurality of relatively greatly expanded beads or granules 34, of the chemical composition described previously. The skin 90 of the pipe cover 88 is substantially harder and more impervious than the core 89 of the pipe cover, the core being of comparable density and structure to the blank 30 previously described. The thicker but relatively hard skin 90 is highly advantageous in insulative applications.

In making the pipe cover 88, beads 34 of a proper initial density are chosen and pre-expanded to 50-75% of their original size and packed around a rectangular sponge core 89 in the mold cavity 94 of dies 96, 98, as shown in FIGURE 13. It will be noted that in order to support the top rows or layers of the beads 34, the sides 99, 100 of the mold cavity 94 must be filled with the beads 34. In order to keep the sides filled with the beads 34 while not, at the same time, unduly increasing the density of the finished article by the introduction of too many beads along the sides thereof, the beads are first pre-expanded to between 50-75% of their original size, as mentioned. No adhesives are required for positioning the beads 34.

Referring now especially to the process diagram of FIGURE 12, after the pre-expansion process step indicated by 102, the beads 34 and core 89 are quickly loaded into dies 96 and 98, as just described. The dies 96 and 98 are heated at 104, prior to the loading step 106, to a temperature above the softening point of the particular thermoplastic beads employed and also to a temperature above their expansion point.

The expansion and fusion of the granules 34 under the influence of heat take place rapidly. On the other hand, the sponge core 89 is an insulative body and the rate of heat penetration thereinto is relatively slow. Thus, by the time the beads or granules 34 are sufficiently expanded and fused together under appropriate conditions of pressure to be described, the surface of the core 89 has been only slightly softened to a depth of not greater than a quarter of an inch. That is to say, the core 89 remains substantially undeformed throughout the forming process, and substantially retains its original structure, density and form.

Inasmuch as the beads are allowed to expand greatly, for example, to twenty times their original size, the actual forming pressure required in the pressing and/or forming step 107 is less than that required where a hard-shelled thin surface is desired. In most instances, a forming pressure of between 1-10 lbs. per square inch is sufficient. The resulting skin, while a great deal tougher and stronger than the original thermoplastic blank or core material, has some porosity but is smooth and has the great advantage that its insulating qualities are not impaired to any degree during the molding thereof. A cross-section of a completed pipe cover is shown in FIGURE 11, two halves of the pipe cover formed according to the process previously described being connected along the joints 110 by any suitable adhesive, such as hexane or pentane.

In order to prevent the beads from expanding beyond a desired point, the dies 96, 98 are immediately cooled below the expansion temperature of the beads in the cooling step 108. The rate of cooling is very rapid in contrast to processes of the prior art. For example, according to the prior art, the mold cavity 94 is partially filled with beads 34 only, and the surface and interior of the article, after being formed, are cooled from above the softening point of the thermoplastic granules to below their expansion temperature. The cooling of such an article made entirely of beads 34 takes a much longer time than the cooling of the surface of the article 88 formed according to our process, above-described.

While several embodiments of the articles and processes have been shown and described, it will be understood that modifications and changes may be made which lie within the scope of the invention. Therefore, we do not intend to be limited by the embodiments herein shown and described, but only by the appended claims.

We claim:

1. A process for producing a smooth, impervious hardened surface on a thermoplastic sponge body which comprises; applying granular material to a surface of said thermoplastic sponge body, the granules of said granular material containing a heat-expandable agent having a boiling point substantially below the softening point of the thermoplastic sponge body; heating said sponge body and granules to a temperature above the softening points of said sponge body and said granules and above the expansion point of said granules to thereby expand said granules and cause fusion of said granules together with said thermoplastic sponge; applying pressure exceeding that pressure required to overcome the expansive pressure of said granules to thereby crush and fuse said granules and to cause fusion between said granules and the surface of said sponge body thereby forming an integral hardened skin on the surface of said sponge; and immediately cooling said article below the temperature at which substantial expansion of said granules takes place.

2. The process of claim 1 wherein a reinforcing material is applied to the surface of said thermoplastic article prior to the heating thereof.

3. The process of claim 1 wherein said sponge and said granules are composed of materials selected from a group consisting of cellulose derivative plastic and polystyrene plastics, said body and said granules are heated to temperatures of between 180° F. and 260° F., the pressure applied lies between one and fifty pounds per square inch, and said cooling temperature is approximately equal to the ambient temperature.

4. The process of claim 1 wherein said expandable granular materials are applied to said sponge material by means of a solvent adhesive selected from the group consisting of ketones, esters, and halogenated hydrocarbons.

5. A process for simultaneously molding and producing a hard shell on a blank of thermoplastic sponge material which comprises first applying a thin film of solvent adhesive selected from a group consisting of ketones, esters, and halogenated hydrocarbons to a surface of said sponge material; affixing heat-expandable granules to the surface of said thermoplastic sponge having solvent adhesive applied thereto, said granules comprising thermoplastic material and a volatile organic liquid, having a boiling point of between 85° F. and 160° F., homogeneously dispersed therein; heating said granules in place on the surface of said body at a temperature above the softening point of said body and said granules and above the boiling point of said volatile organic liquid to thereby expand said granules and cause fusion therebetween, and fushion of said granules with said sponge body; applying a pressure exceeding that pressure required to compress said granules and overcome the pressure exerted by said volatile organic liquid during volatilization thereof, to thereby crush said granules together and accelerate the fusion between said granules and the surface of said body and between said granules themselves to form said hard shell, said pressure exceeding that pressure required to mold said sponge material and granules to the desired shape of the article; and immediately cooling said molded, hard-skinned article to a temperature below that at which substantial expansion of said granules takes place.

References Cited in the file of this patent

UNITED STATES PATENTS

| | | |
|---|---|---|
| 2,586,275 | Toulmin | Feb. 19, 1952 |
| 2,728,698 | Rudner | Dec. 27, 1955 |
| 2,732,324 | Morris | Jan. 24, 1956 |
| 2,737,461 | Heisler et al. | Mar. 6, 1956 |
| 2,767,436 | Noland et al. | Oct. 23, 1956 |
| 2,787,809 | Stastny | Apr. 9, 1957 |
| 2,819,981 | Schornstheimer et al. | Jan. 14, 1958 |
| 2,865,800 | Stastny | Dec. 23, 1958 |
| 2,878,153 | Hacklander | Mar. 17, 1959 |